US012512617B2

(12) United States Patent
Miyamura et al.

(10) Patent No.: US 12,512,617 B2
(45) Date of Patent: Dec. 30, 2025

(54) CONNECTOR WITH CORRECTING PORTION FOR LOCK ARM

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Tetsuya Miyamura, Mie (JP); Shinji Nozaki, Mie (JP); Daisuke Saito, Mie (JP); Hideto Nakamura, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 364 days.

(21) Appl. No.: 18/021,967

(22) PCT Filed: Jul. 30, 2021

(86) PCT No.: PCT/JP2021/028319
§ 371 (c)(1),
(2) Date: Feb. 17, 2023

(87) PCT Pub. No.: WO2022/049947
PCT Pub. Date: Mar. 10, 2022

(65) Prior Publication Data

US 2023/0352869 A1 Nov. 2, 2023

(30) Foreign Application Priority Data

Sep. 7, 2020 (JP) ................................ 2020-149655

(51) Int. Cl.
*H01R 13/42* (2006.01)
*H01R 13/627* (2006.01)

(52) U.S. Cl.
CPC ......... *H01R 13/42* (2013.01); *H01R 13/6272* (2013.01)

(58) Field of Classification Search
CPC .................................................... H01R 13/627
(Continued)

(56) References Cited

U.S. PATENT DOCUMENTS 5,879,192 A 3/1999 Machida et al.
6,824,417 B1 * 11/2004 Nimura ................ H01R 13/641 439/352

(Continued)

FOREIGN PATENT DOCUMENTS

JP 2011-040215 A 2/2011
JP 2014-096227 A 5/2014
JP 2020-064709 A 4/2020

OTHER PUBLICATIONS

International Search Report issued on Oct. 12, 2021 for WO 2022/049947 A1 (4 pages).

*Primary Examiner* — Phuong K Dinh
(74) *Attorney, Agent, or Firm* — Venjuris, P.C.

(57) ABSTRACT

It is aimed to satisfactorily correct the position of a lock arm. A connector (1) is provided with a first housing (10), female terminal fittings (27) to be inserted into the first housing (10) from behind, a second housing (50) to be connected to the first housing (10), a lock arm (22) provided at the first housing (10) and displaceable to a lock position where the first and second housings (10, 50) are locked in a connected state by the lock arm locking the second housing (50) and a lock releasing position where separation of the first and second housings (10, 50) is enabled by releasing the locking,
(Continued)

and a correcting portion (74) arranged to face a surface on an unlocking direction side of the lock arm (22) in the connected state.

7 Claims, 7 Drawing Sheets

(58) Field of Classification Search
USPC ................................ 439/352, 357, 595, 752
See application file for complete search history.

(56) References Cited

U.S. PATENT DOCUMENTS

| | | | | |
|---|---|---|---|---|
| 9,368,909 | B2 * | 6/2016 | Yagi | H01R 13/6272 |
| 2001/0029124 | A1 | 10/2001 | Hasegawa | |
| 2016/0149333 | A1 | 5/2016 | Yoshigi et al. | |
| 2019/0296487 | A1 | 9/2019 | Iida | |
| 2022/0029339 | A1 | 1/2022 | Miyamura et al. | |

* cited by examiner

CONNECTOR WITH CORRECTING PORTION FOR LOCK ARM

CROSS REFERENCE TO RELATED APPLICATIONS

This application is a national phase of PCT application No. PCT/JP2021/028319, filed on Jul. 30, 2021, which claims priority from Japanese patent application No. 2020-149655, filed on Sep. 7, 2020, all of which are incorporated herein by reference.

TECHNICAL FIELD

The present disclosure relates to a connector.

BACKGROUND

Patent Document 1 discloses a conventional connector. In this connector, a female connector is provided with a lock arm including a lock protrusion. The lock protrusion of the female connector is locked to a vertical surface formed in a lock recess of a male connector. In this way, a connected state of the female and male connectors is maintained.

PRIOR ART DOCUMENT

Patent Document

Patent Document 1: JP 2020-064709 A
Patent Document 2: JP 2019-169294 A

SUMMARY OF THE INVENTION

Problems to be Solved

Front and rear end parts of the lock arm are coupled to a female housing by joining portions. A central part in a front-rear direction of the lock arm is not coupled to the female housing and a clearance is formed between the female housing and the lock arm. Thus, if a state where an external force is applied to the central part in the front-rear direction of the lock arm continues for a long time, for example, during a transportation process or the like, the lock arm may be deformed and remain close to the female housing. Even if the female connector including the lock arm deformed in this way is connected to the male connector, locking between the lock protrusion and the lock recess may be easily released.

The present disclosure was completed on the basis of the above situation and aims to satisfactorily correct the position of a deformed lock arm.

Means to Solve the Problem

The present disclosure is directed to a connector with a first housing, a terminal fitting to be inserted into the first housing from behind, a second housing to be connected to the first housing, a lock arm provided at the first housing, the lock arm being displaceable to a lock position where the first and second housings are locked in a connected state by the lock arm locking the second housing and a lock releasing position where separation of the first and second housings is enabled by releasing the locking, and a correcting portion arranged to face a surface on an unlocking direction side of the lock arm in the connected state.

Effect of the Invention

According to the present disclosure, the position of a lock arm can be satisfactorily corrected.

DETAILED DESCRIPTION TO EXECUTE THE INVENTION

Description of Embodiments of Present Disclosure

Figure 1:
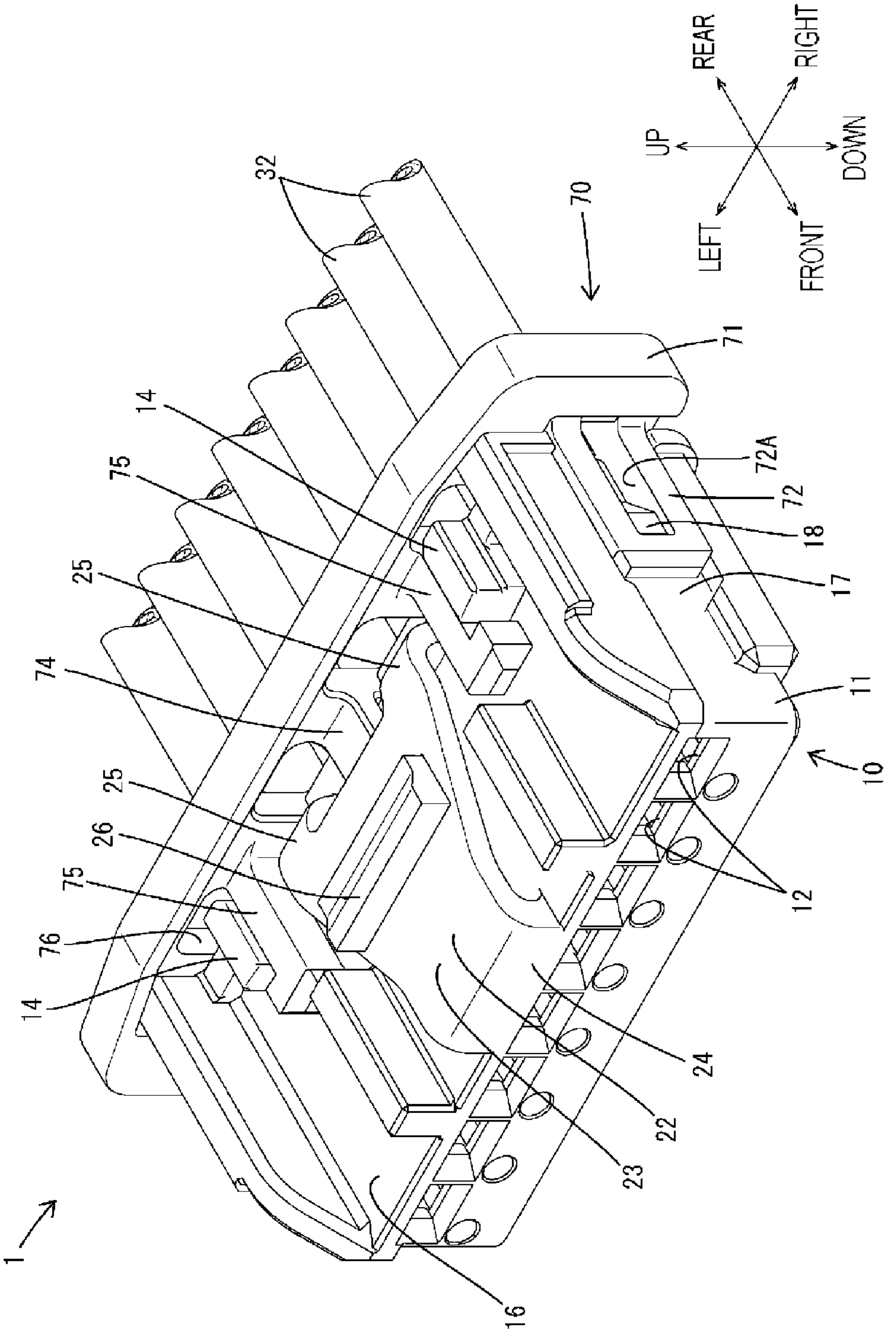
FIG. 1 is a perspective view showing a state where female terminal fittings and a retainer are mounted in and on a first housing of a first embodiment when view obliquely from a front-upper side.

First, embodiments of the present disclosure are listed and described.

(1) The connector of the present disclosure is provided with a first housing, a terminal fitting to be inserted into the first housing from behind, a second housing to be connected to the first housing, a lock arm provided at the first housing, the lock arm being displaceable to a lock position where the first and second housings are locked in a connected state by the lock arm locking the second housing and a lock releasing position where separation of the first and second housings is enabled by releasing the locking, and a correcting portion arranged to face a surface on an unlocking direction side of the lock arm in the connected state. According to this configuration, even if the lock arm is displaced to the lock releasing position, the lock arm can be corrected to the lock position by the correcting portion.

(2) Preferably, the correcting portion of the connector of the present disclosure is provided at a retainer for retaining the terminal fitting. According to this configuration, an increase in the number of components can be suppressed by providing the retainer with the correcting portion.

(3) Preferably, the lock arm of the connector of the present disclosure includes a protrusion to be locked to the second housing in the connected state in a central part in a front-rear direction and is coupled to the first housing at three positions by a front coupling portion provided in a front end part and a pair of rear coupling portions provided on both left and right sides of a rear end part, the retainer is mounted on the first housing from behind, and a tip of the correcting portion is located behind the protrusion when the retainer retains the terminal fitting. According to this configuration, since the correcting portion can allow a displacement of the region provided with the protrusion of the lock arm to the lock releasing position while correcting the position of the lock arm, the housings in the connected state can be separated.

(4) Preferably, the correcting portion of the connector of the present disclosure is arranged in a central part in a lateral direction of the retainer, and the retainer includes a pair of locking portions for holding the retained state by respectively locking both left and right sides of the first housing and a pair of movement restricting portions arranged closer to a lateral center than the pair of locking portions to sandwich the correcting portion, the pair of movement restricting portions restricting a rearward movement of the correcting portion. According to this configuration, even if the terminal fitting is pulled rearward with the locking portions locked to the first housing, a state where the correcting portion arranged in the central part in the lateral direction of the retainer is arranged to face the surface on the unlocking direction side of the lock arm can be held and a state of the lock arm corrected to the lock position can be held by the movement restricting portions.

(5) Preferably, the correcting portion of the connector of the present disclosure is provided at the second housing, the lock arm includes a protrusion to be locked to the second housing in the connected state in a central part in a front-rear direction, and a tip of the correcting portion is located to correspond to only a region not formed with the protrusion in the connected state. According to this configuration, since the correcting portion can allow a displacement of the region provided with the protrusion of the lock arm to the lock releasing position while correcting the position of the lock arm to the lock position, the housings in the connected state can be separated.

(6) Preferably, the lock arm of the connector of the present disclosure is coupled to the first housing by a pair of front coupling portions provided on both left and right sides of a front end part, and the correcting portion is inserted into between the pair of front coupling portions from front when the first and second housings are brought into the connected state. According to this configuration, since the deformation of a part of the lock arm near the front coupling portions to the lock releasing position is suppressed by the front coupling portions, the correcting portion is easily inserted into between the pair of front coupling portions.

DETAILS OF EMBODIMENTS OF PRESENT DISCLOSURE

First Embodiment

Figure 2:
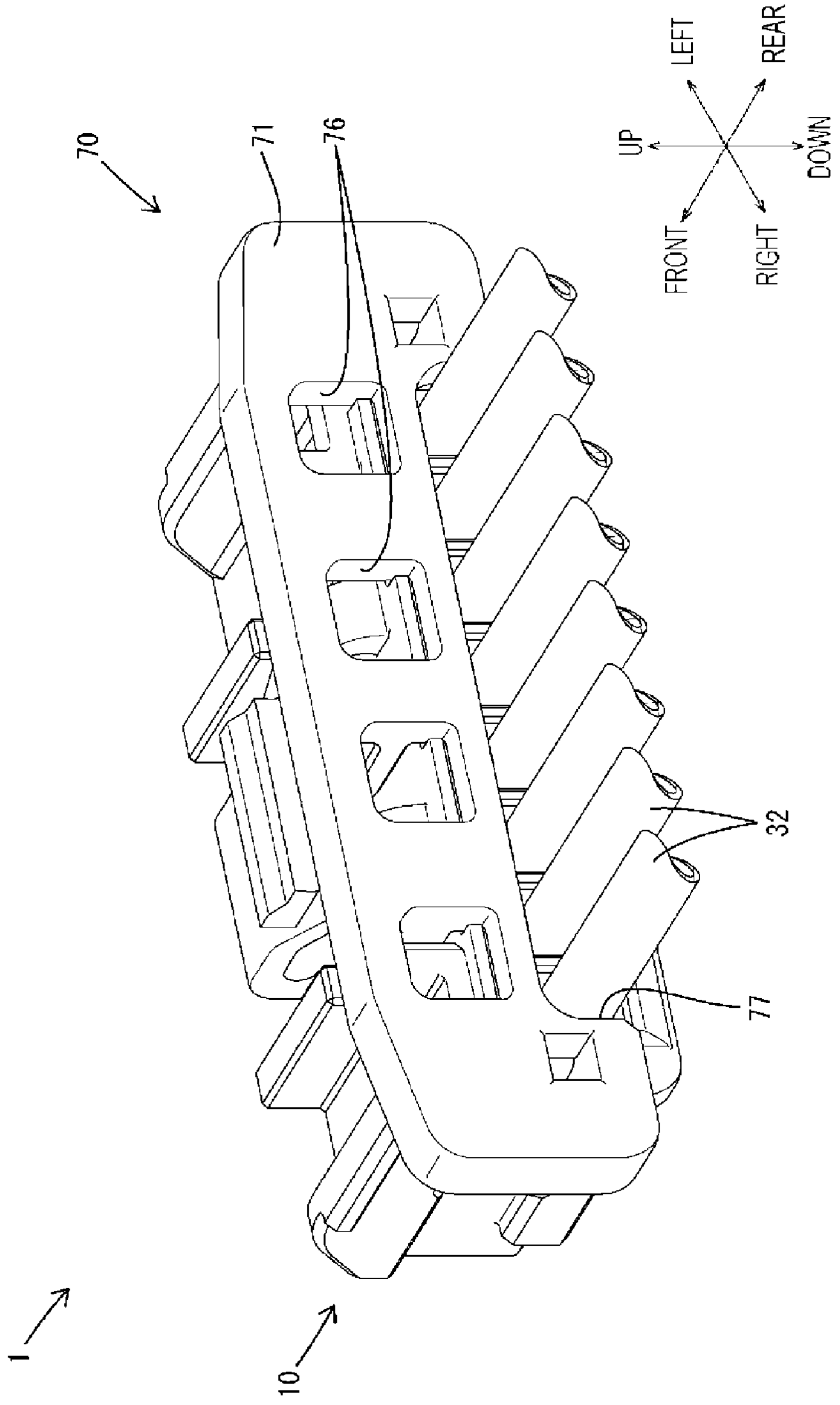
FIG. 2 is a perspective view showing the state where the female terminal fittings and the retainer are mounted in and on the first housing of the first embodiment when view obliquely from a rear-upper side.
Figure 3:
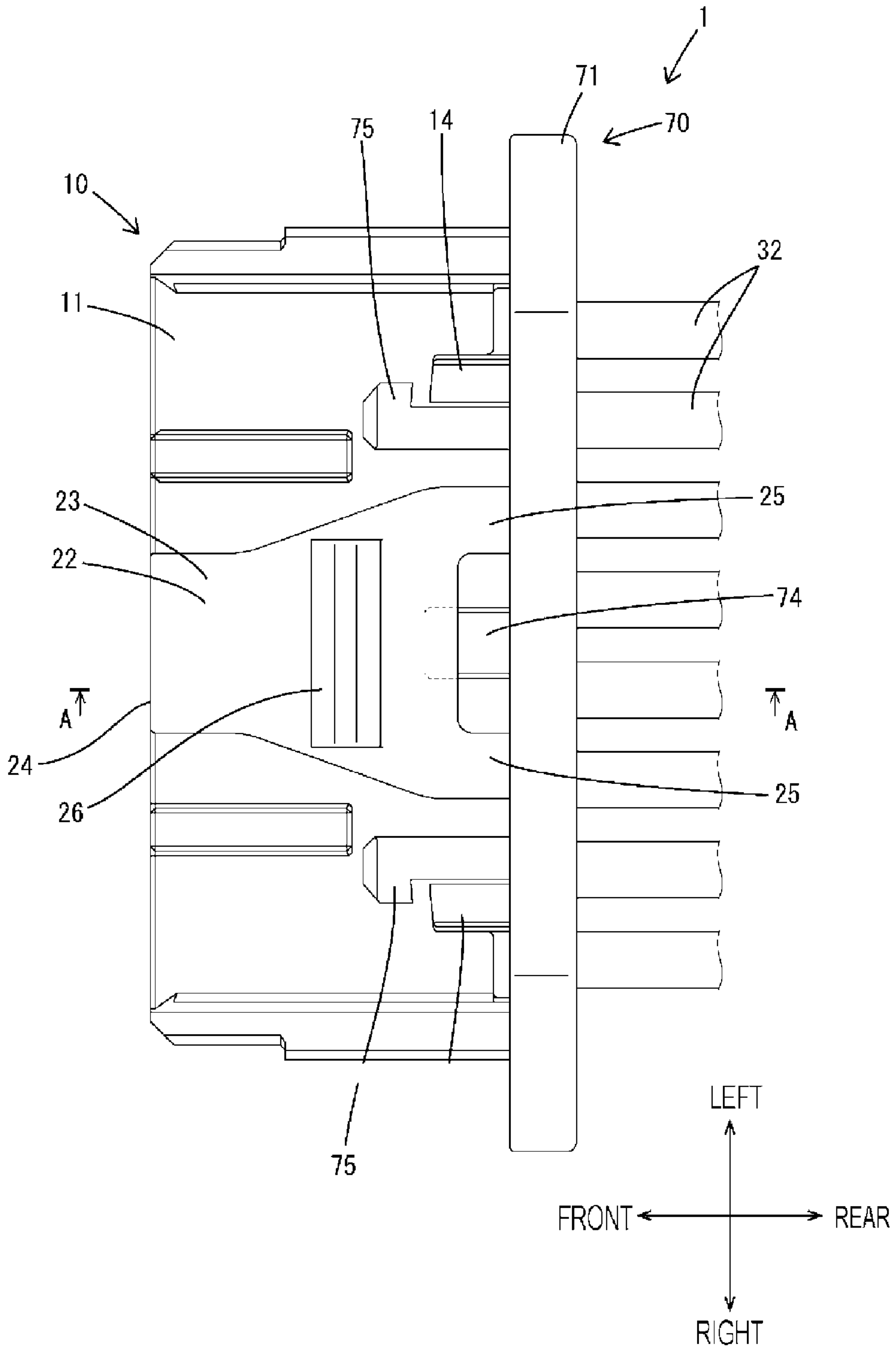
FIG. 3 is a plan view showing the state where the female terminal fittings and the retainer are mounted in and on the first housing of the first embodiment when viewed from above.

A first specific embodiment of the present disclosure is described with reference to FIGS. 1 to 5. Note that, in the following description, left and right sides in FIG. 3 are defined as front and rear sides concerning a front-rear direction. Frontal and back sides in FIG. 3 are defined as upper and lower sides concerning a vertical direction. Upper and lower sides in FIG. 3 are defined as left and right sides concerning a lateral direction.

A connector 1 of the first embodiment is provided with a first housing 10 made of synthetic resin, a lock arm 22 provided on the first housing 10, a plurality of female terminal fittings 27, which are terminal fittings, a retainer 70 made of synthetic resin and a second housing 50 made of synthetic resin.

As shown in FIG. 1, the first housing 10 is a single member integrally formed with a terminal accommodating portion 11 having a block-like shape as a whole and the lock arm 22 to be described later. A plurality of terminal accommodation chambers 12 are formed side by side in the lateral direction in the terminal accommodating portion 11. A locking lance 13 resiliently deformable in the vertical direction is formed at the lower surface of the terminal accommodation chamber 12 (see FIG. 4). The rear end of the terminal accommodation chamber 12 is open in the rear end surface of the first housing 10.

A pair of recesses 17 recessed toward a lateral center of the first housing 10 are formed in both left and right outer side surfaces of the first housing 10. First locked portions 18 to be locked by locking portions 72 of the retainer 70 are provided to project in leftward and rightward directions (hereinafter, may also be referred to as laterally outward directions) from the lateral center in the respective recesses 17. A pair of second locked portions 14 projecting upward are provided on an outer surface 16 (upper surface) of the terminal accommodating portion 11 of the first housing 10. The respective second locked portions 14 are arranged to the left and right of a rear end part of the lock arm 22.

The lock arm 22 is integrally formed to the first housing 10. The lock arm 22 includes an arm body portion 23, a front coupling portion 24, a pair of rear coupling portions 25 and a protrusion 26. The arm body portion 23 extends in the front-rear direction along the outer surface 16 (upper surface) of the terminal accommodating portion 11. The front coupling portion 24 extends downward from a front end part of the arm body portion 23 and is coupled to the outer surface 16 (upper surface) of the terminal accommodating portion 11. One rear coupling portion 25 is arranged on each of left and right sides of a rear end part of the arm body portion 23, extends downward from the rear end part of the arm body portion 23 and is coupled to the outer surface 16 (upper surface) of the terminal accommodating portion 11. That is, the lock arm 22 is coupled to the first housing 10 at three positions by the front coupling portion 24 and the pair of rear coupling portions 25.

The protrusion 26 is formed to project upward from the upper surface of the arm body portion 23 in a central part in the front-rear direction of the upper surface of the arm body portion 23. The central part in the front-rear direction of the arm body portion 23 is resiliently deformable in the vertical direction with the front coupling portion 24 and the rear coupling portions 25 of the lock arm 22 as fulcrums. When the lock arm 22 is not resiliently deformed, the arm body portion 23 is arranged at a lock position (see FIG. 4) to face the outer surface 16 (upper surface) of the terminal accommodating portion 11 across a predetermined clearance in the vertical direction. If a force is applied in a downward direction to the arm body portion 23, the arm body portion 23 is deflected downward and approaches the outer surface 16 (upper surface) of the terminal accommodating portion 11 to be displaced to a lock releasing position.

Figure 4:
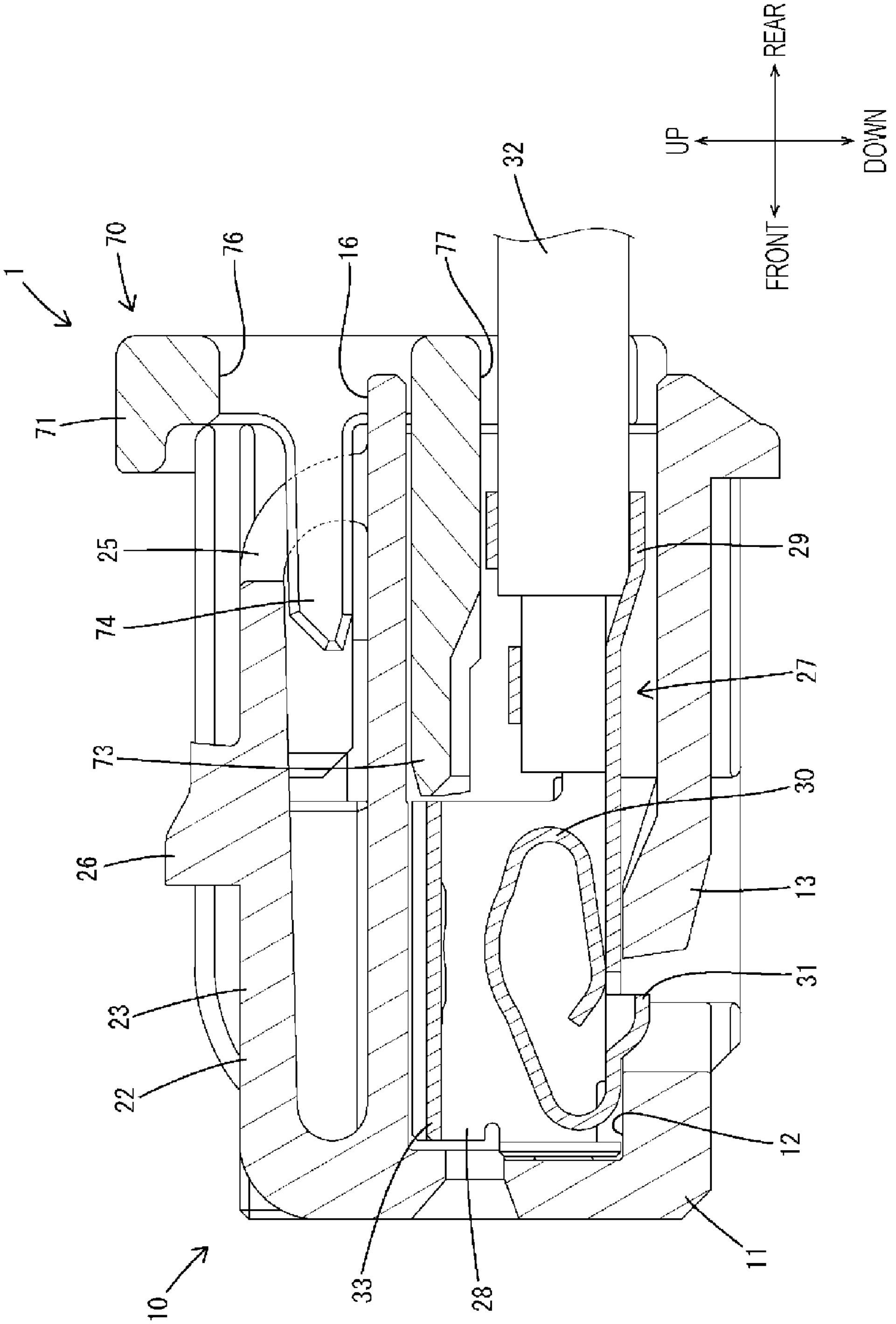
FIG. 4 is a section along A-A in FIG. 3.

As shown in FIG. 4, the female terminal fitting 27 includes a rectangular tube portion 28 in a front end part and a crimping portion 29 in the form of an open barrel in a rear end part. A resilient contact piece 30 is accommodated in the rectangular tube portion 28. A projection-like primary locking portion 31 is formed on the lower surface of the rectangular tube portion 28. A lower plate portion constituting the rectangular tube portion 28 is connected to a base plate portion of the crimping portion 29. The crimping portion 29 is electrically conductively crimped to a front end part of a coated wire 32.

An upper plate portion 33 constituting the rectangular tube portion 28 is located above the crimping portion 29. Due to a height difference of the upper plate portion 33 and the crimping portion 29, a retaining portion 73 of the retainer 70 to be described later can be arranged above the crimping portion 29, whereby the rear end of the upper plate portion 33 of the rectangular tube portion 28 can be locked to the tip of the retaining portion 73. In this way, the female terminal fitting 27 is held in a retained state.

The female terminal fitting 27 is inserted into the terminal accommodation chamber 12 from behind the first housing 10. The female terminal fitting 27 inserted to a proper position is held in the retained state by locking the primary locking portion 31 to the locking lance 13. The coated wire 32 fixed to the female terminal fitting 27 is drawn out rearward from the first housing 10. The upper plate portion 33 is adjacent to and facing the lower surface of an upper wall portion of the terminal accommodation chamber 12.

The retainer 70 has a function of retaining the female terminal fittings 27 inserted into the first housing 10. As shown in FIGS. 1, 2 and 4, the retainer 70 is a single member including a rear wall portion 71, a pair of bilaterally symmetrical locking portions 72, a plurality of the retaining portions 73, a correcting portion 74 and a pair of bilaterally symmetrical movement restricting portions 75. The rear wall portion 71 is in the form of a flat plate having a plate thickness direction oriented in the front-rear direction. In a back view, the rear wall portion 71 is formed with a plurality of holes 76 penetrating in the front-rear direction (thickness direction of the rear wall portion 71). The rear wall portion 71 is formed with escaping portions 77 by cutting regions corresponding to the terminal accommodation chambers 12 in the back view. The escaping portions 77 are open in the lower end edge of the rear wall portion 71 to avoid the interference of the coated wires 32 and the retainer 70.

The pair of locking portions 72 are arranged on both left and right end parts of the front surface of the rear wall portion 71. The locking portion 72 is cantilevered forward from the front surface of the rear wall portion 71. A slit 72A is formed from a base end to a tip part in a vertically central part of each locking portion 72. Each locking portion 72 can be resiliently displaced in the lateral direction with the base end (part connected to the rear wall portion 71) thereof as a fulcrum.

As shown in FIG. 4, the plurality of retaining portions 73 are cantilevered forward from the front surface (surface facing the rear end of the first housing 10) of the rear wall portion 71. A projecting direction of the retaining portion 73 is parallel to an inserting direction of the female terminal fitting 27 into the first housing 10 and an assembling direction of the retainer 70 with the first housing 10. The respective retaining portions 73 are arranged at positions closer to a lateral center than both left and right ends of the rear wall portion 71 (not shown).

The retainer 70 is mounted on a rear end part of the terminal accommodating portion 11 from behind the first housing 10. In assembling the retainer 70, the pair of locking portions 72 are slid along and in contact with the recesses 17 formed in the both left and right side surfaces of the terminal accommodating portion 11. In this way, the retainer 70 is positioned in the vertical direction with respect to the first housing 10 and guided with inclination in the vertical direction restricted.

The correcting portion 74 is cantilevered forward from the front surface (surface facing the rear end of the first housing 10) of the rear wall portion 71. A projecting direction of the correcting portion 74 is parallel to the inserting direction of the female terminal fittings 27 into the first housing 10 and the assembling direction of the retainer 70 with the first housing 10. The correcting portion 74 is arranged in a central part in the lateral direction of the rear wall portion 71 (see FIG. 3).

As shown in FIG. 3, the pair of movement restricting portions 75 are arranged closer to the lateral center than both left and right ends and closer to the lateral center than the pair of locking portions 72 on the front surface of the rear wall portion 71. The pair of movement restricting portions 75 are arranged to sandwich the correcting portion 74 from left and right sides. Each movement restricting portion 75 is cantilevered forward from the front surface of the rear wall portion 71. A tip part of the left movement restricting portion 75 is bent leftward. A tip part of the right movement restricting portion 75 is bent rightward. Each movement restricting portion 75 can be resiliently displaced in the lateral direction with the base end (part connected to the rear wall portion 71) thereof as a fulcrum.

In an assembling process of the retainer 70, the respective movement restricting portions 75 are resiliently deformed in directions toward the lateral center to approach each other as the tip parts of the movement restricting portions 75 pass forward through the second locked portions 14. Along with this, the respective locking portions 72 are resiliently deformed outward in the lateral direction away from each other as the tip parts of the locking portions 72 pass forward through the first locked portions 18. Along with this, the correcting portion 74 is inserted into between the arm body portion 23 and the outer surface 16 (upper surface) of the terminal accommodating portion 11 and between the pair of rear coupling portions 25 (see FIG. 4). Then, the rear wall portion 71 of the retainer 70 comes into contact with the rear end of the terminal accommodating portion 11. Along with this, the tip parts of the movement restricting portions 75 pass forward through the second locked portions 14 and resiliently return outward in the lateral direction. Then, the tip parts of the locking portions 72 pass forward through the first locked portions 18 and resiliently return outward in the lateral direction. At this time, the correcting portion 74 is arranged to face a surface on an unlocking direction side of the lock arm 22. At this time, no external force is applied to the lock arm 22 and the lock arm 22 is arranged at the lock position.

When resiliently returning, the tip parts of the movement restricting portions 75 face to come into contact with the second locked portions 14 from front (see FIG. 1). When the tip parts of the locking portions 72 resiliently return, the first locked portions 18 enter the slits 72A and the tip parts of the locking portions 72 face to come into contact with the first locked portions 18 from front (see FIG. 1). In this way, the retainer 70 is restricted from being separated rearward with respect to the first housing 10. The pair of movement restricting portions 75 are arranged closer to the lateral center than the pair of locking portions 72 to sandwich the correcting portion 74 from left and right sides. Thus, if the coated wire 32 is pulled rearward, the pair of movement restricting portions 75 can prevent the laterally central part of the rear wall portion 71 from being curved and deflected rearward, restrict a rearward movement of the correcting portion 74 and maintain a state where the correcting portion 74 is arranged between the arm body portion 23 and the outer surface 16 (upper surface) of the terminal accommodating portion 11.

In assembling the retainer 70 with the first housing 10, the respective retaining portions 73 are inserted into the respective terminal accommodation chambers 12 of the first housing 10 from behind. If the assembling of the retainer 70 with the first housing 10 is completed, the tips of the retaining portions 73 face to be adjacent to the rear ends of the upper plate portions 33 of the rectangular tube portions 28 from behind (see FIG. 4). Accordingly, with the retainer 70 assembled with the first housing 10, even if the coated wire 32 is pulled rearward, the rear end of the upper plate portion 33 of the rectangular tube portion 28 is in contact with the front end of the retaining portion 73. Thus, a rearward relative displacement of the female terminal fitting 27 can be restricted. The female terminal fitting 27 is reliably held in the retained state by the locking lance 13 of the first housing 10 and the retaining portion 73 of the retainer 70. That is, the pair of locking portions 72 hold the female terminal fittings 27 in the retained state by being locked to the first locked portions 18 on both left and right sides of the first housing 10. At this time, the tip of the correcting portion 74 is located behind the protrusion 26 and in front of the pair of rear coupling portions 25 (see FIG. 4).

Figure 5:
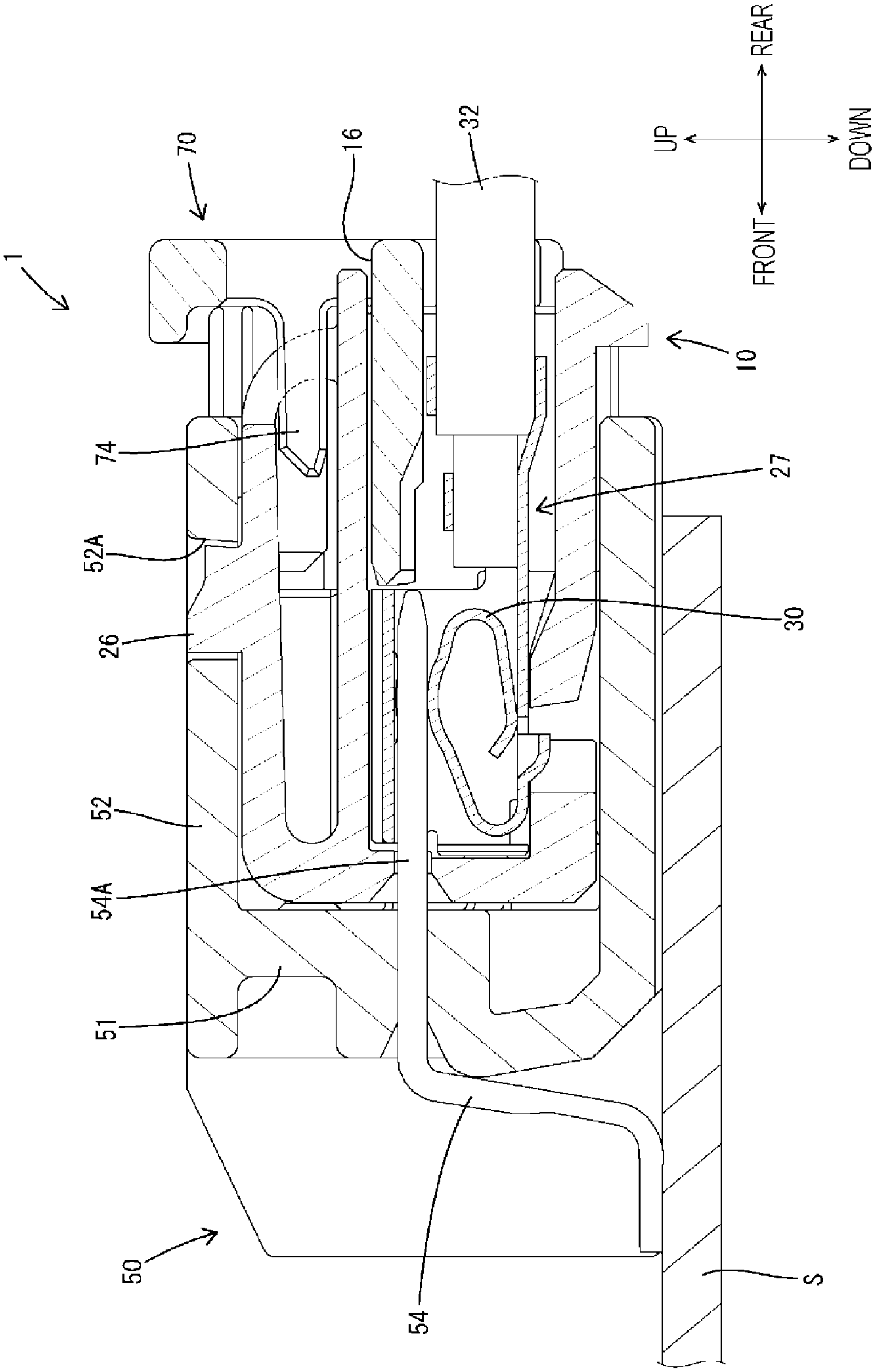
FIG. 5 is a side view in section showing a connected state of the first housing mounted with the female terminal fittings and the retainer and a second housing in the first embodiment.

The first housing 10 can be connected to the second housing 50. As shown in FIG. 5, the second housing 50 is mounted on a circuit board S. Male terminal fittings 54 are mounted in the second housing 50. The second housing 50 includes a wall-like terminal penetration portion 51 and a receptacle 52 in the form of a rectangular tube projecting rearward from the outer peripheral edge of the terminal penetration portion 51.

An upper surface part constituting the receptacle 52 is formed with a lock hole 52A. The male terminal fittings 54 are passed through the terminal penetration portion 51. A tab 54A formed on a tip part of the male terminal fitting 54 is accommodated in the receptacle 52. A base end part of the male terminal fitting 54 is fixed to the circuit board S by solder.

In the process of connecting the first housing 10 to the second housing 50, the protrusion 26 of the lock arm 22 interferes with the upper surface part of the receptacle 52, whereby the lock arm 22 is deflected in a direction (downward direction) to approach the upper surface (outer surface 16) of the terminal accommodating portion 11 and release the connected state and the first housing 10 is displaced to the lock releasing position where the first housing 10 can be inserted into and withdrawn from the second housing 50. At this time, the deflection of a region of the arm body portion 23 along and below which the correcting portion 74 is arranged is suppressed, whereas the deflection of a region below which the correcting portion 74 is not arranged (region of the arm body portion 23 where the protrusion 26 is located) is allowed. Thus, a force required in connecting the first and second housings 10, 50 is larger as compared to the case where the correcting portion 74 is not provided.

When the first and second housings 10, 50 reach a properly connected position, the lock arm 22 resiliently returns from the lock releasing position to the lock position, the protrusion 26 is locked into the lock hole 52A of the second housing 50 and the first and second housings 10, 50 are locked in the connected state. That is, the protrusion 26 is locked to the second housing 50 in the connected state. The deflection of the lock arm 22 is suppressed by the correcting portion 74. Thus, a force for holding the connected state of the first and second housings 10, 50 is larger as compared to the case where the correcting portion 74 is not provided.

Next, functions and effects of the first embodiment are described.

The connector 1 of the present disclosure is provided with the first housing 10, the female terminal fittings 27 to be inserted into the first housing 10 from behind, the second housing 50 to be connected to the first housing 10, the lock arm 22 provided on the first housing 10 and displaceable to the lock position where the first and second housings 10, 50 are locked in the connected state by the lock arm 22 locking the second housing 50 and the lock releasing position where the separation of the first and second housings 10, 50 is enabled by releasing the locking, and the correcting portion 74 arranged to face the surface on the unlocking direction side of the lock arm 22 in the connected state. According to this configuration, even if the lock arm 22 is displaced to the lock releasing position, the lock arm 22 can be corrected to the lock position by the correcting portion 74.

The correcting portion 74 of the connector 1 of the present disclosure is provided on the retainer 70 for retaining the female terminal fittings 27. According to this configuration, an increase in the number of components can be suppressed by providing the retainer 70 with the correcting portion 74.

The lock arm 22 of the connector 1 of the present disclosure includes the protrusion 26 to be locked to the second housing 50 in the connected state in the central part in the front-rear direction, is coupled to the first housing 10 at three positions by the front coupling portion 24 provided in the front end part and the pair of rear coupling portions 25 provided on both left and right sides of the rear end part, the retainer 70 is mounted on the first housing 10 from behind, and the tip of the correcting portion 74 is located behind the protrusion 26 when the female terminal fittings 27 are retained by the retainer 70. According to this configuration, since the correcting portion 74 can allow the region provided with the protrusion 26 of the lock arm 22 to be displaced to the lock releasing position while correcting the position of the lock arm 22, the housings in the connected state can be separated.

The correcting portion 74 of the present disclosure is arranged in the central part in the lateral direction of the retainer 70, and the retainer 70 includes the pair of locking portions 72 for holding the retained state by respectively locking the both left and right sides of the first housing 10 and the pair of movement restricting portions 75 arranged closer to the lateral center than the pair of locking portions 72 to sandwich the correcting portion 74 and configured to restrict a rearward movement of the correcting portion 74. According to this configuration, even if the female terminal fitting 27 is pulled rearward with the locking portions 72 locked to the first housing 10, a state where the correcting portion 74 arranged in the central part in the lateral direction of the retainer 70 is arranged to face the surface on the unlocking direction side of the lock arm 22 can be held and a state where the lock arm 22 is corrected to the lock position can be held by the movement restricting portions 75.

Second Embodiment

A connector 2 according to a second embodiment of the present disclosure is described with reference to FIGS. 6 and 7. The connector 2 according to the second embodiment differs from the first embodiment in that a correcting portion 174 is provided in a second housing 50 and a lock arm 22 is provided with a pair of front coupling portions 124. The same components as those of the first embodiment are denoted by the same reference signs and the structures, functions and effects thereof are not described.

Figure 6:
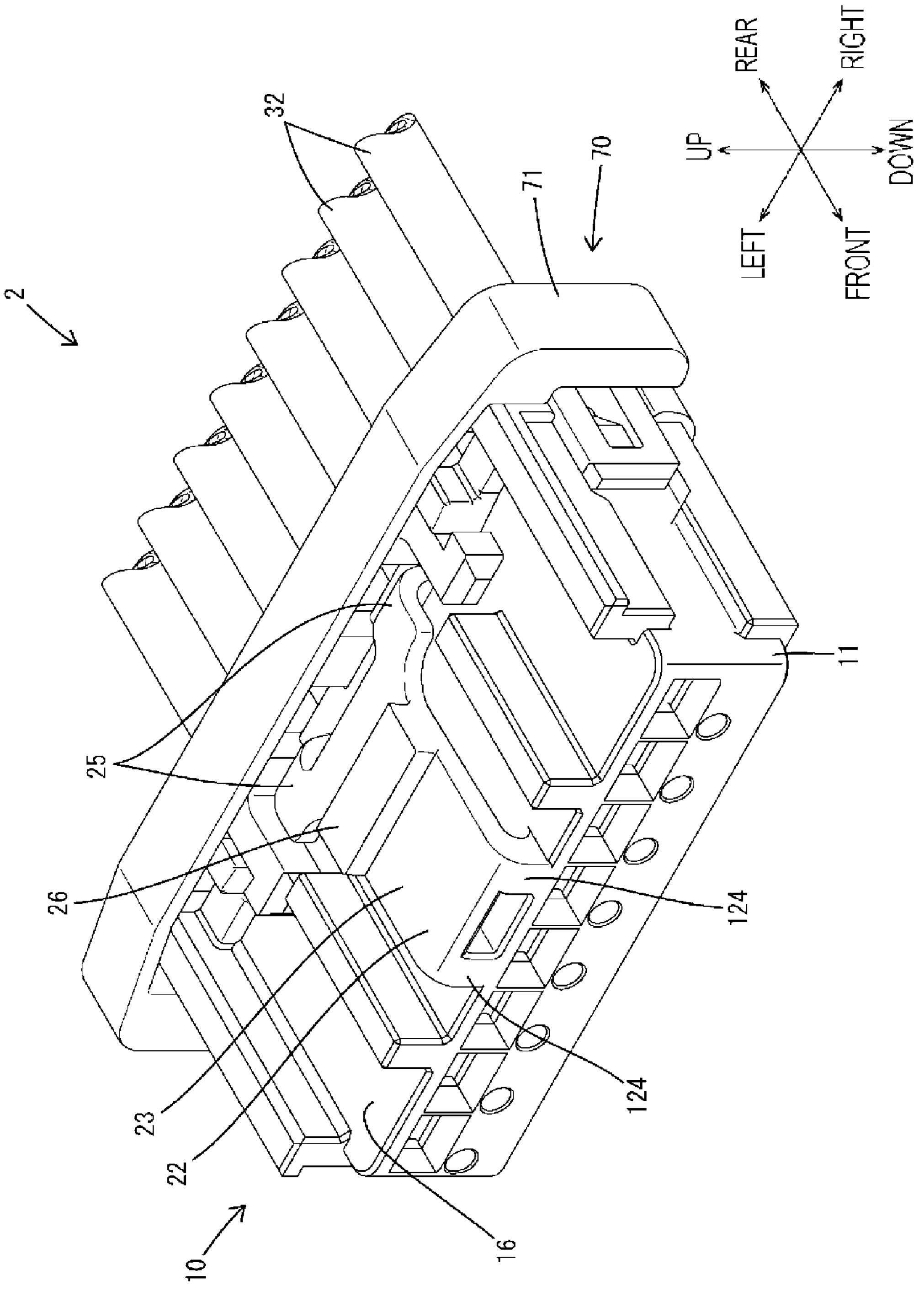
FIG. 6 is a perspective view showing a state where female terminal fittings and a retainer are mounted in and on a first housing of a second embodiment when view obliquely from a front-upper side.

As shown in FIG. 6, the lock arm 22 includes an arm body portion 23, the pair of front coupling portions 124, a pair of rear coupling portions 25 and a protrusion 26. One front coupling portion 124 is arranged on each of left and right sides of a front end part of the arm body portion 23, extends downward from the front end part of the arm body portion 23 and is coupled to an outer surface 16 (upper surface) of a terminal accommodating portion 11. The arm body portion 23 is arranged at a lock position where the arm body portion 23 is facing the outer surface 16 (upper surface) of the terminal accommodating portion 11 across a predetermined clearance in the vertical direction (see FIG. 7). The protrusion 26 is formed to project upward from the upper surface of the arm body portion 23 in a central part in the front-rear direction of the upper surface of the arm body portion 23.

Figure 7:
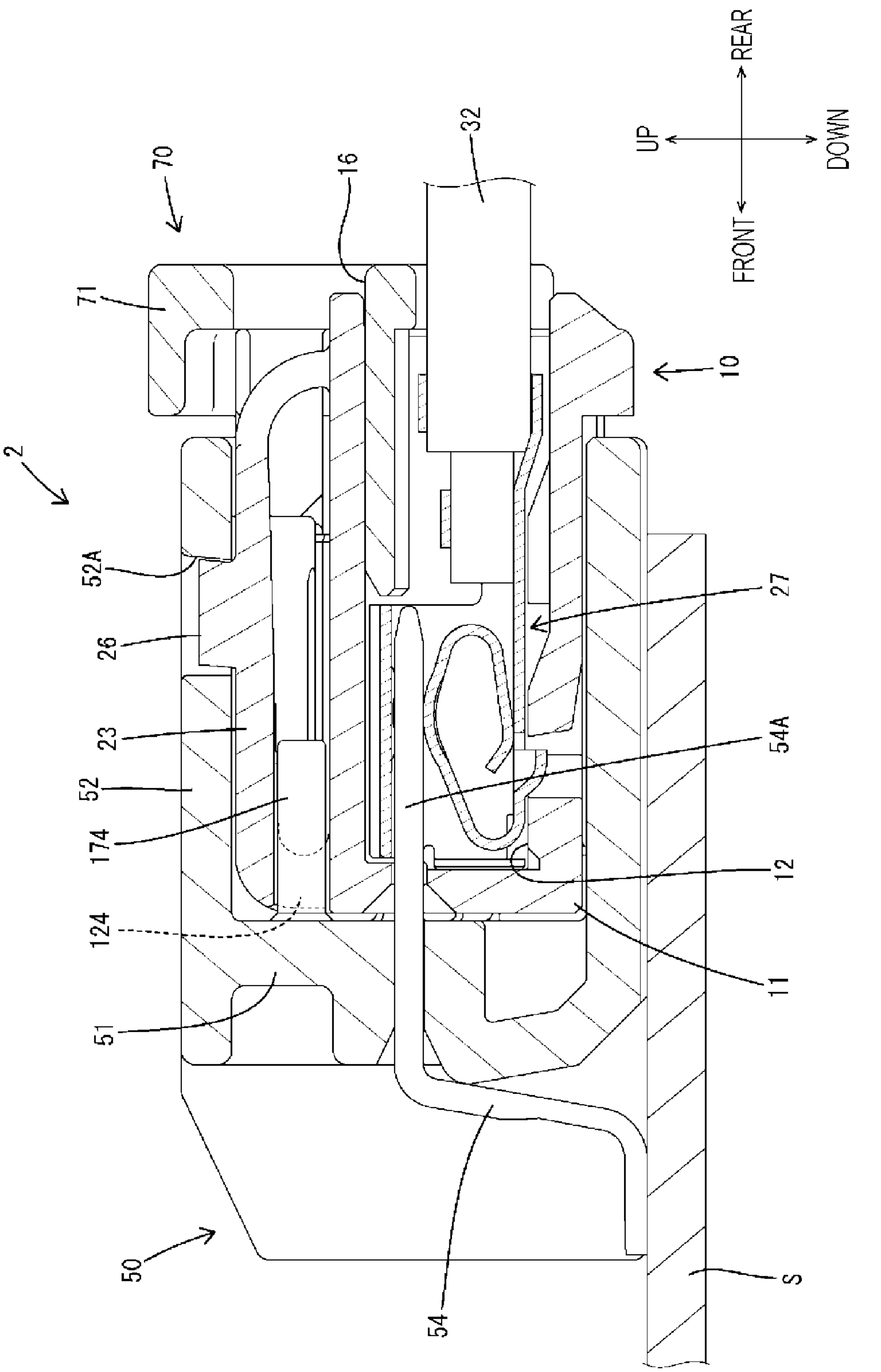
FIG. 7 is a side view in section showing a connected state of a first housing mounted with female terminal fittings and a retainer and a second housing in a second embodiment.

As shown in FIG. 7, a terminal penetration portion 51 of a second housing 50 is provided with the correcting portion 174. The correcting portion 174 is cantilevered rearward from the rear surface (surface facing the front end of a first housing 10) of the terminal penetration portion 51. A projecting direction of the correcting portion 174 is parallel to a connecting direction of the first housing 10 to the second housing 50. The correcting portion 174 is arranged in a central part in the lateral direction of the terminal penetration portion 51 and above tabs 54A of male terminal fittings 54.

The first housing 10 having the female terminal fittings 27 inserted in terminal accommodation chambers 12 and having a retainer 70 mounted thereon is connected to the second housing 50. In an initial process of connecting the first housing 10 to the second housing 50, the correcting portion 174 is not arranged below the arm body portion 23. Thus, the protrusion 26 interferes with an upper surface part of a receptacle 52 and the lock arm 22 is easily deflected in a direction (downward direction) to approach the upper surface (outer surface 16) of the terminal accommodating portion 11. In this way, the lock arm 22 can be displaced to a lock releasing position.

In connecting the first and second housings 10, 50, the correcting portion 174 provided in the second housing 50 is inserted into between the arm body portion 23 and the outer surface 16 (upper surface) of the terminal accommodating portion 11 and between the pair of front coupling portions 124 from front. If the first housing 10 is further connected to the second housing 50 and the first and second housings 10, 50 reach a properly connected position, the lock arm 22 resiliently returns from the lock releasing position to the lock position, the protrusion 26 is locked into a lock hole 52A and the first and second housings 10, 50 are locked in a connected state. At this time, the tip of the correcting portion 174 is located in front of the protrusion 26 and behind the pair of front coupling portions 124 (front end of the lock arm 22).

At this time, the deflection of a region of the arm body portion 23 below which the correcting portion 174 is arranged is suppressed and that of a region below which the correcting portion 174 is not arranged (region of the arm body portion 23 where the protrusion 26 is located) is allowed. Thus, a force for holding the connected state of the first and second housings 10, 50 is larger as compared to the case where the correcting portion 174 is absent.

Next, functions and effects of the second embodiment are described.

The correcting portion 174 of the connector 2 of the present disclosure is provided in the second housing 50, the lock arm 22 includes the protrusion 26 to be locked to the second housing 50 in the connected state in the central part in the front-rear direction, and the tip of the correcting portion 174 is located to correspond to only the region where the protrusion 26 is not formed in the connected state. According to this configuration, the correcting portion 174 can allow a displacement of the region provided with the protrusion 26 of the lock arm 22 to the lock releasing position while correcting the position of the lock arm 22 to the lock position. Thus, the housings in the connected state can be separated.

The lock arm 22 of the connector 2 of the present disclosure is coupled to the first housing 10 by the pair of front coupling portions 124 provided on both left and right sides of the front end part, and the correcting portion 174 is inserted into between the pair of front coupling portions 124 from front when the first and second housings 10, 50 are brought into the connected state. According to this configuration, since the deformation of a part of the lock arm 22 near the front coupling portions 124 to the lock releasing position is suppressed by the front coupling portions 124, the correcting portion 174 is easily inserted into between the pair of front coupling portions 124.

Other Embodiments

The present disclosure is not limited to the above described and illustrated embodiments, but is represented by claims. The present disclosure is intended to include all changes in the scope of claims and in the meaning and scope of equivalents and also include the following embodiments.

(1) The correcting portion may be provided at each of the retainer and the second housing.

(2) The correcting portion may be a single member. Specifically, after the first and second housings are connected, the correcting portion may be inserted into between the arm body portion and the outer surface of the terminal accommodating portion via an insertion hole formed in the retainer for the insertion of the correcting portion.

LIST OF REFERENCE NUMERALS

1, 2 . . . connector
10 . . . first housing
11 . . . terminal accommodating portion
12 . . . terminal accommodation chamber
13 . . . locking lance
14 . . . second locked portion
16 . . . outer surface
17 . . . recess
18 . . . first locked portion
22 . . . lock arm
23 . . . arm body portion
24, 124 . . . front coupling portion
25 . . . rear coupling portion
26 . . . protrusion
27 . . . female terminal fitting (terminal fitting)
28 . . . rectangular tube portion
29 . . . crimping portion
30 . . . resilient contact piece
31 . . . primary locking portion
32 . . . coated wire
33 . . . upper plate portion
50 . . . second housing

51 . . . terminal penetration portion
52 . . . receptacle
52A . . . lock hole
54 . . . male terminal fitting
54A . . . tab
70 . . . retainer
71 . . . rear wall portion
72 . . . locking portion
72A . . . slit
73 . . . retaining portion
74, 174 . . . correcting portion
75 . . . movement restricting portion
76 . . . hole
77 . . . escaping portion
S circuit board

What is claimed is:

1. A connector, comprising:

a first housing;

a terminal fitting to be inserted into the first housing from behind;

a second housing to be connected to the first housing;

a lock arm provided at the first housing, the lock arm being displaceable to a lock position where the first and second housings are locked in a connected state by the lock arm locking the second housing and a lock releasing position where separation of the first and second housings is enabled by releasing the locking; and a correcting portion arranged to face a surface on an unlocking direction side of the lock arm in the connected state, wherein the lock arm is coupled to the first housing at three positions by a front coupling portion provided in a front end part and a pair of rear coupling portions provided on both left and right sides of a rear end part, and the correcting portion is inserted into a space between the pair of rear coupling portions.

2. The connector of claim 1, wherein the correcting portion is provided at a retainer for retaining the terminal fitting.

3. The connector of claim 2, wherein:

the lock arm includes a protrusion to be locked to the second housing in the connected state in a central part in a front-rear direction, the retainer is mounted on the first housing from behind, and a tip of the correcting portion is located behind the protrusion when the retainer retains the terminal fitting.

4. The connector of claim 2, wherein:

the correcting portion is arranged in a central part in a lateral direction of the retainer, and the retainer includes:

a pair of locking portions for holding the retained state by respectively locking both left and right sides of the first housing; and a pair of movement restricting portions arranged closer to a lateral center than the pair of locking portions to sandwich the correcting portion, the pair of movement restricting portions restricting a rearward movement of the correcting portion.

5. The connector of claim 1, wherein:

the correcting portion is provided at the second housing, the lock arm includes a protrusion to be locked to the second housing in the connected state in a central part in a front-rear direction, and a tip of the correcting portion is located to correspond to only a region not formed with the protrusion in the connected state.

6. The connector of claim 5, wherein:

the lock arm is coupled to the first housing by a pair of front coupling portions provided on both left and right sides of a front end part, and the correcting portion is inserted into between the pair of front coupling portions from front when the first and second housings are brought into the connected state.

7. A connector, comprising:

a first housing;

a terminal fitting to be inserted into the first housing from behind;

a second housing to be connected to the first housing;

a lock arm provided at the first housing, the lock arm being displaceable to a lock position where the first and second housings are locked in a connected state by the lock arm locking the second housing and a lock releasing position where separation of the first and second housings is enabled by releasing the locking; and a correcting portion arranged to face a surface on an unlocking direction side of the lock arm in the connected state, wherein the correcting portion is provided at a retainer for retaining the terminal fitting, the correcting portion is arranged in a central part in a lateral direction of the retainer, and the retainer includes:

a pair of locking portions for holding the retained state by respectively locking both left and right sides of the first housing; and a pair of movement restricting portions arranged closer to a lateral center than the pair of locking portions to sandwich the correcting portion, the pair of movement restricting portions restricting a rearward movement of the correcting portion.

* * * * *